May 4, 1965 R. L. SCHALLER 3,181,561
BALANCED REGULATING VALVE
Filed Nov. 20, 1961 2 Sheets-Sheet 1
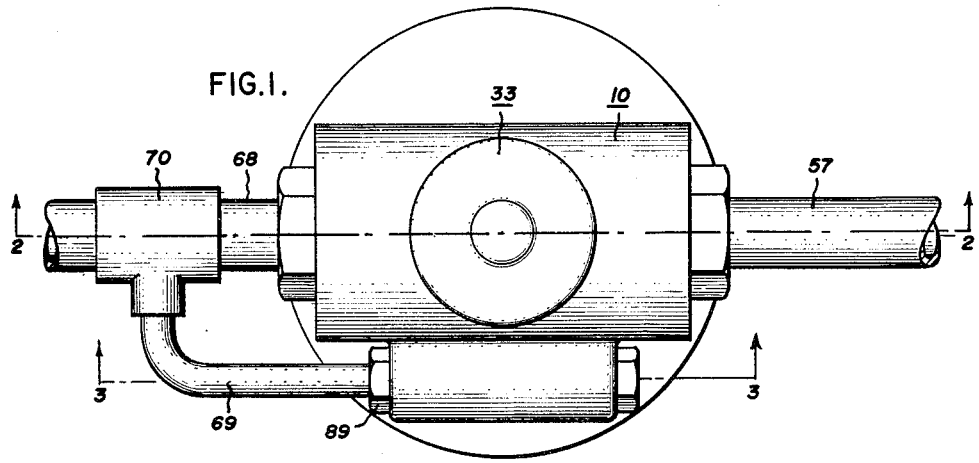
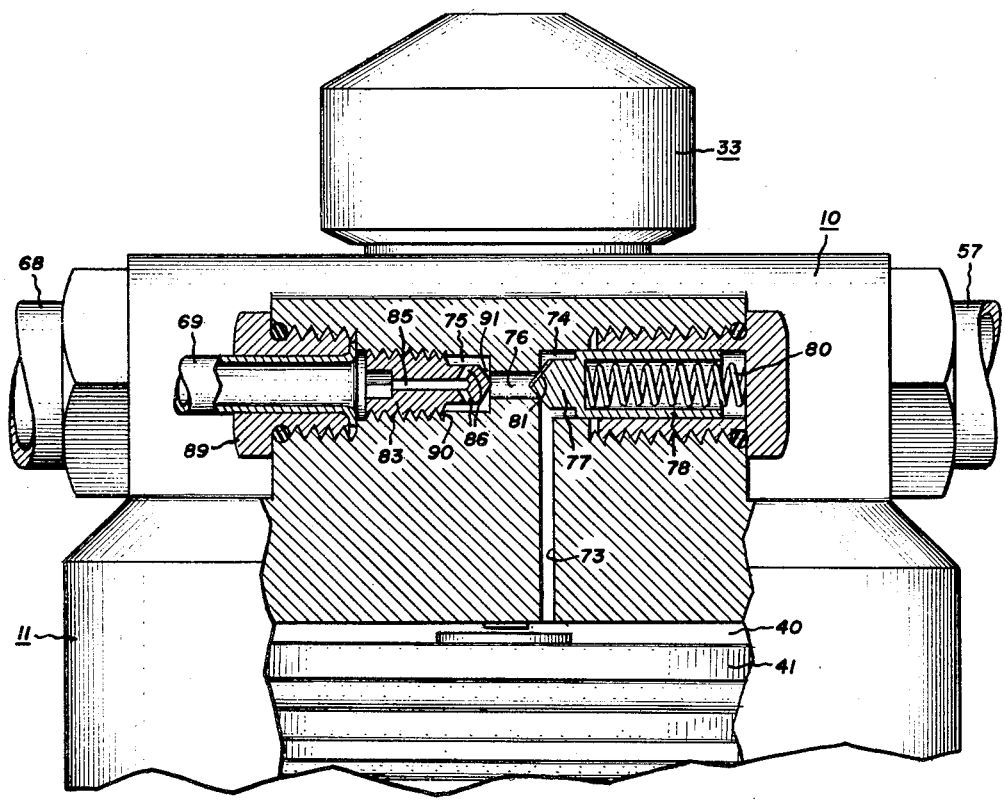
INVENTOR:
ROBERT L. SCHALLER,
BY *Q. Emmett Thompson*
HIS ATTORNEY.

INVENTOR:
ROBERT L. SCHALLER,
BY *D. Emmett Thompson*
HIS ATTORNEY.

United States Patent Office

3,181,561
Patented May 4, 1965

3,181,561
BALANCED REGULATING VALVE
Robert L. Schaller, Camillus, N.Y., assignor to Engelberg, Inc., Syracuse, N.Y., a corporation of New York
Filed Nov. 20, 1961, Ser. No. 153,426
2 Claims. (Cl. 137—505.18)

This invention relates to regulating valves of the poppet type supplied with fluid at high pressure and employed to provide a lower predetermined pressure at the downstream side of the valve. These valves are frequently used in lines supplying fluid at extremely high pressure in the neighborhood of 6000 p.s.i. and supply reduced pressure to apparatus having relatively small cubic dimension. In such cases, the reduced pressure is very quickly established and with conventional valves, the predetermined reduced pressure is exceeded, or over-shot, due to the fact that the regulating valve does not respond rapid enough to close before the high pressure fluid gets into the down-stream line. This creates a serious hazard where the upstream, or supply, pressure is much greater than can be withstood by the apparatus to which the regulator valve is connected.

This invention has as an object a poppet type regulating valve embodying a structural arrangement which will maintain a predetermined reduced pressure within exceptionally close limits, and functions with particularly rapid response to prevent the pressure on the down-stream side of the valve exceeding, or overshooting to any appreciable degree, the desired predetermined reduced pressure.

The invention has as a further object a reducing valve of the poppet type embodying a particularly effective and efficient seal on the valve stem at the high pressure side of the valve seat.

The invention also includes an arrangement whereby the flow of fluid in the sensing line from the reduced pressure side of the valve to the poppet actuating mechanism can be varied to obtain more precise regulation and quicker response for a given installation.

The invention consists in the novel features and in the combinations and constructions hereinafter set forth and claimed.

In describing this invention, reference is had to the accompanying drawings in which like characters designate corresponding parts in all the views.

In the drawings—

FIGURE 1 is a top plan view of a regulating valve embodying my invention.

FIGURE 3 is an enlarged view taken on line 3—3, FIGURE 1.

Figure 2:
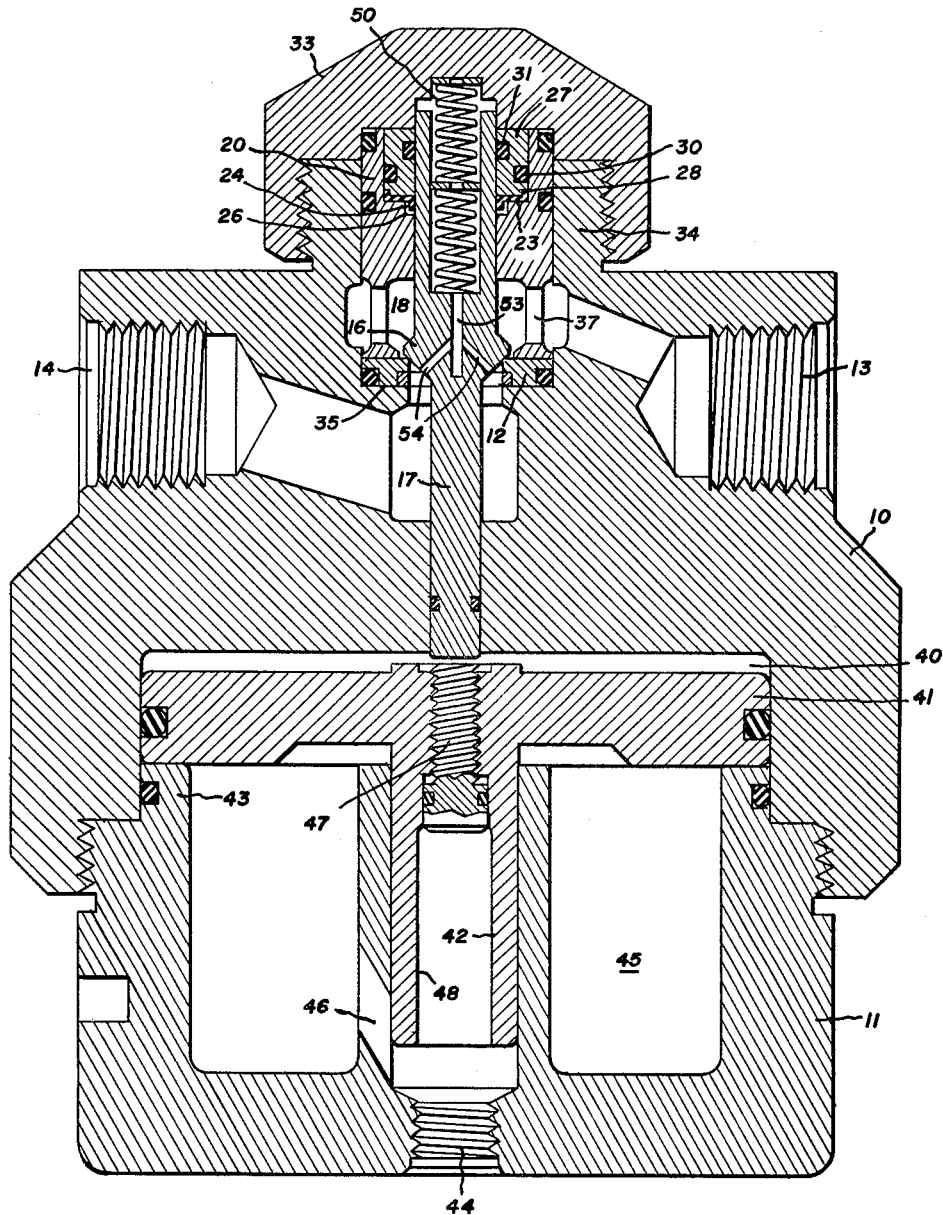
FIGURE 2 is an enlarged vertical sectional view.

The valve consists of a housing formed of upper and lower sections 10, 11. The section 11 is secured to the upper section 10 by being threaded thereto. The upper section 10 is formed with a valve compartment in which is positioned an annular seat 12. An inlet port 13 communicates with the valve chamber above the seat 12, and an outlet port 14 communicates with the valve chamber below the seat. There is a poppet valve 16 mounted in the housing for vertical movement into and out of engagement with the seat and is operable, when in engagement with the seat, to close off the inlet port from the outlet port.

The valve 16 is provided with a downwardly extending stem 17 slidably mounted in a bore formed in the upper housing section 10. The valve also has an upwardly extending stem portion slidably mounted in a sleeve 20 positioned in a bore formed in the section 10 above the valve compartment, see FIGURE 2. The upper portion of the sleeve 20 is formed with a counterbore to provide a shoulder on which is positioned a circular seal 23 having a downwardly extending cylindrical flange 24 encircling the upper stem portion 18. The sleeve 20 is counterbored immediately below the shoulder to provide an annular recess 26 into which the flange 24 of the seal is positioned.

The seal is compressed against the shoulder by a bushing 27, formed in its periphery with a circumferentially extending groove at its inner end to receive an outer cylindrical flange 28 of the seal. The flange 28 of the seal fits snugly into the counterbore of the sleeve and accordingly, the inner flange 26 is maintained in snug engagement with the valve stem 18. The bushing 27 is also formed intermediate its ends with a circumferential groove in its periphery, in which an O-ring packing 30 is positioned. The bushing is formed with a similar groove on its inner surface to receive an O-ring packing 31 encircling the stem portion 18.

The bushing 27 is compressed against the seal 23 by a nut 33 threaded upon a hub portion 34 extending upwardly from the housing section 10. The sleeve 20 extends downwardly through the upper portion of the valve chamber and engages the seat 12, and functions to hold the seat on an annular shoulder 35 formed in the section 10. The downwardly extending portion of the sleeve is formed with openings 37 to permit fluid from the inlet port 13 to enter the upper portion of the valve chamber above the seat 12.

The valve stem 17 is slidably positioned in a bore formed in the section 10, and the lower end of the stem extends into the upper end portion 40 of a cylinder formed in the lower portion of the section 10, and in which there is mounted a piston 41. The lower section 10 is formed with a central bore in which the stem 42 of the piston 41 is slidably mounted. Downward movement of the piston is limited by an annular flange portion 43 formed on the section 11 and extending into the cylinder. The central bore in the section 11 extends through the bottom wall thereof and is threaded, as at 44, to receive a conduit connected to a source of fluid, the pressure of which is maintained at some predetermined value.

The lower housing section 11 is formed with a relatively large annular recess 45 confronting the under side of the piston 41. The port 44 is connected to the recess 45 by a passage 46, whereby the regulated supply of fluid is applied against the under side of the piston 41 urging it upwardly. The flange 43 of the section 11 positions the piston, in its downward location, so that the volume of the space 40 is relatively small, compared with the volume of the recess 45. A screw 47 is threaded through the piston 41, the head of the screw being available to receive an adjusting tool through a bore 48 formed in the piston stem 42. The screw 47 is located at the axis of the piston, and in alignment with the lower valve stem 17. The arrangement is such that, upon upward movement of the piston 41, the screw 47 engages the stem 17, moving the valve 16 upwardly from the seat 12, to permit the flow of fluid from the inlet port 13 to the outlet port 14.

The upper stem portion 18 of the valve is formed with a bore in which is located a compression spring 50, this spring acting against the bottom of the bore and the cap nut 33, and serves to urge the valve 16 downwardly into closed position against the seat 12. The stem portion 18 is formed with an axially extending passage 53 communicating with diverging passages 54 in the valve 16, the passages 54 terminating below the area of the valve contacting the seat 12. When the valve is moved upwardly by the piston 41 off from the seat 12, high pressure fluid, entering through the inlet port 13, passes upwardly through the passages 54, 53, and upwardly through the bore in which the spring 50 is mounted, whereby pressure is applied on the top of the valve over the cross sectional area of the stem 18 to effect a balancing effect on the valve, as will be well understood in regulators of this type.

Referring to FIGURE 1, a conduit 57 extending from a supply of fluid under high pressure is connected to the inlet port 13. A conduit 68 is connected to the outlet port 14. A conduit 69 is connected to the outlet conduit 68 through a T fitting 70. The conduit 69 constitutes a sensing line to transmit the pressure in conduit 68 to the space 40 above the piston 41.

The upper housing section 10 is formed with a passage 73 extending upwardly from the space 40 above the piston 41 to a valve chamber 74. The valve chamber 74 is connected to a valve chamber 75 by a connecting passage 76, the ends of which provide valve seats in the chambers 74, 75. A valve 77 is slidably mounted in a bushing 78 threaded into the section 10. The valve 77 is urged inwardly by a compression spring 80 which serves to normally maintain the inner conical end portion of the valve 77 seated against the end of the passage 76. This conical end portion of the valve is formed with a slot 81 to provide some communication between the valve chamber 74 and the passage 76 even when the valve is closed, as shown in FIGURE 3.

A valve 83 is threaded into the section 10 and has an inner conical portion positioned in the valve chamber 75. The valve 83 is formed with an axially extending passage 85 communicating with diverging passages 86. The sensing conduit 69 is connected to a fitting 89 threaded into the section 10, whereby fluid is conducted from the discharge conduit 68 through passages 85, 86, and valve 83, to the valve compartment 75. Inward adjustment of the valve 83 is limited by engagement with a shoulder 90 in which position the conical end surface of the valve is spaced slightly from the end shoulder 91 at the adjacent end of the connecting passage 76. In other words, the valve 83 cannot be threaded inwardly to completely close the valve chamber 75 from the passage 76.

With this arrangement, fluid is conveyed from the conduit 68, through the sensing line 69, to the valve chamber 75, to connecting passage 76, causing the valve 77 to be opened against the action of spring 80, and the fluid conveyed to the space 40 through the vertical passage 73. This fluid acts upon the top surface of the piston 41 and if the desired reduced pressure has been reached in the conduit 68, the piston 41 will be moved downwardly, permitting downward movement of the valve 16 to closed position against the seat 12. Any drop below the predetermined desired pressure in the conduit 68 will result in the regulated fluid pressure in the area 45, moving the piston 41 upwardly to again unseat the valve 16. This reverse flow of fluid from the area 40 will be retarded and limited by the size of the slot 81 in the conical end portion of the valve 77.

By adjusting the valve 83, the flow of fluid through the sensing line 69 to the top side of the piston 41 can be varied, and thus vary the speed at which the piston 41 is actuated relative to the pressure in the down-stream line 68. This, in effect, varies the response of the regulating valve. Due to the fact that the volume of the space 40 is relatively small, the response of the piston 41 is rapid, with the result that when the pressure in the down-stream line 68 has reached the predetermined desired value, the piston 41 is moved downwardly rapidly to close the valve 16, preventing the over-shooting, or building up, of pressure beyond the predetermined value in the down-stream line 68. The adjustment of the valve 83 varies the volume of flow to the space 40 which, in turn, varies the time, or rapidity, of the response of the valve.

What I claim is:

1. A regulating valve of the type described comprising a housing formed with a valve compartment, a valve seat in said compartment, an inlet port communicating with said compartment above said valve seat, an outlet port arranged below said valve seat, a poppet valve positioned in said compartment above said seat, a compression spring urging said valve against said seat, said valve having an upwardly extending stem slidable in a sleeve fixedly mounted in said body above said compartment, said sleeve being formed with a counterbore in its upper portion to provide an annular shoulder encircling the upper portion of said stem in spaced relation thereto, an annular seal positioned on said shoulder and being formed with an inner downwardly extending cylindrical portion encircling said stem and positioned between said shoulder and the stem, said seal having an outer upwardly extending cylindrical portion positioned against said counterbore, a bushing mounted in said counterbore, and means urging said bushing downwardly to clamp said seal against said shoulder, said valve being formed with a passage extending axially upwardly from below the area of the valve contacting said seat and communicating with the area above the upper end of said stem for the transmission of fluid thereto from the area below said seat, said housing being formed with a cylinder below said valve chamber, a piston mounted in said cylinder, means for applying fluid under predetermined constant pressure against the under side of said piston to urge the same upwardly, said valve also having a downwardly extending stem for engagement by said piston when the same is moved upwardly to move said valve from the seat, a conduit extending from said outlet port to the area above said piston for the conveyance of fluid thereagainst to urge said piston downwardly against said predetermined constant pressure.

2. A regulating valve comprising a body formed with a cylinder in the lower portion and a valve chamber in the upper portion, a valve seat in said valve chamber, an inlet port connected with said chamber above said valve seat, an outlet port communicating with said valve chamber below said seat, a poppet valve mounted in said body above said seat for vertical sliding movement, a spring acting on said valve to move the same downwardly into engagement with said seat, said valve having a stem extending downwardly into said cylinder, a piston in said cylinder, stop means in said cylinder for positioning said piston in close adjacency to the upper end of said cylinder, the lower end of said cylinder having a connection to a source of fluid under predetermined constant pressure acting on said piston to urge the same upwardly in contact with said downwardly extending valve stem to move said valve upwardly from said seat for the passage of fluid from said inlet port to said outlet port, said outlet port having a connection to the upper end of said cylinder for the application of pressure on the upper side of said piston to urge the same downwardly against said predetermined pressure, said connection including adjustable flow control means for regulating the flow of fluid to the upper end of said cylinder, and said piston is provided with means adjustable axially thereof for engaging the lower end of said downwardly extending valve stem.

References Cited by the Examiner

UNITED STATES PATENTS

| 1,320,944 | 11/19 | Thoens | 251—282 |
|---|---|---|---|
| 2,615,287 | 10/52 | Senesky | 137—505.42 |
| 2,899,168 | 8/59 | Kleczek | 137—505.18 XR |
| 2,941,543 | 6/60 | Kleczek | 137—505.18 |

FOREIGN PATENTS

| 355,134 | 8/05 | France. |
|---|---|---|
| 846,106 | 8/60 | Great Britain. |

ISADOR WEIL, *Primary Examiner.*